Aug. 2, 1932.   H. J. EARL   1,869,551
WINDSHIELD WIPER
Filed Sept. 15, 1928   2 Sheets-Sheet 2
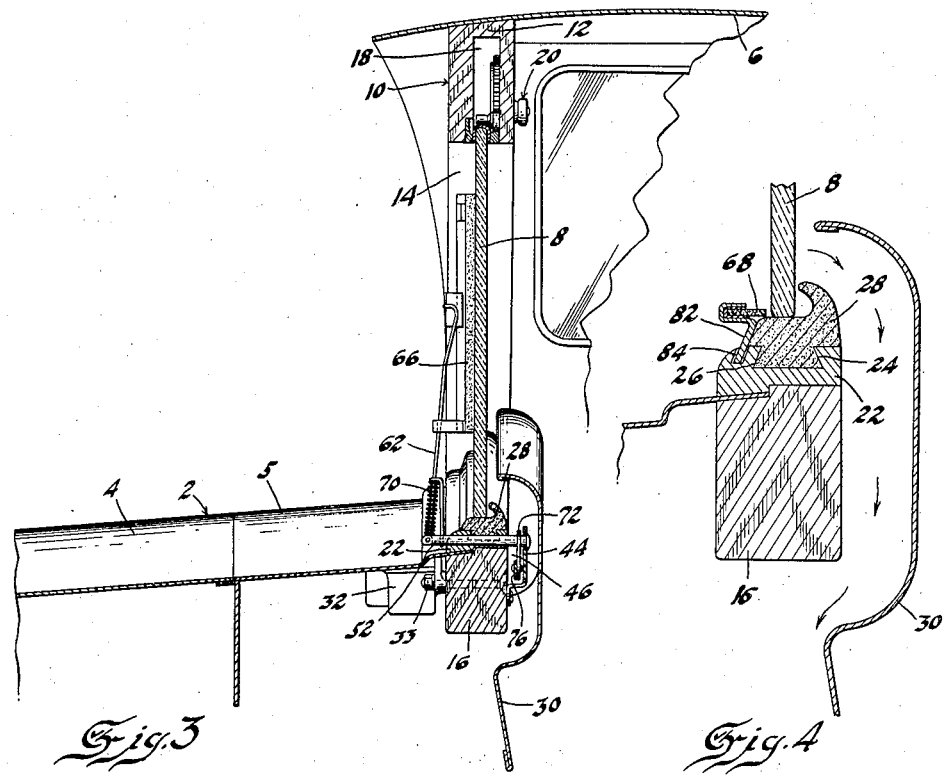
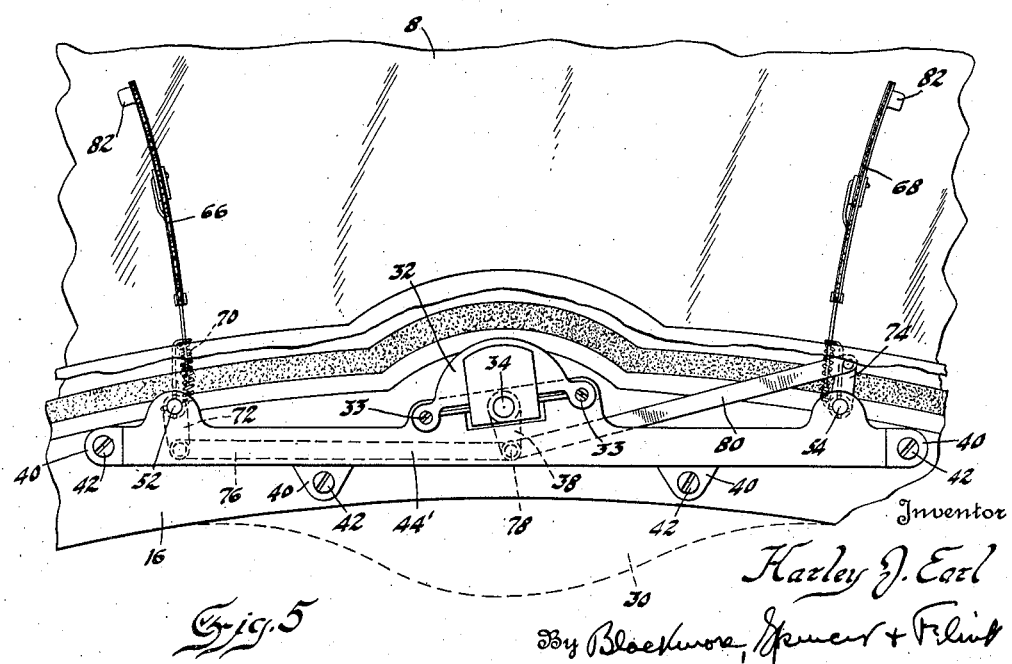

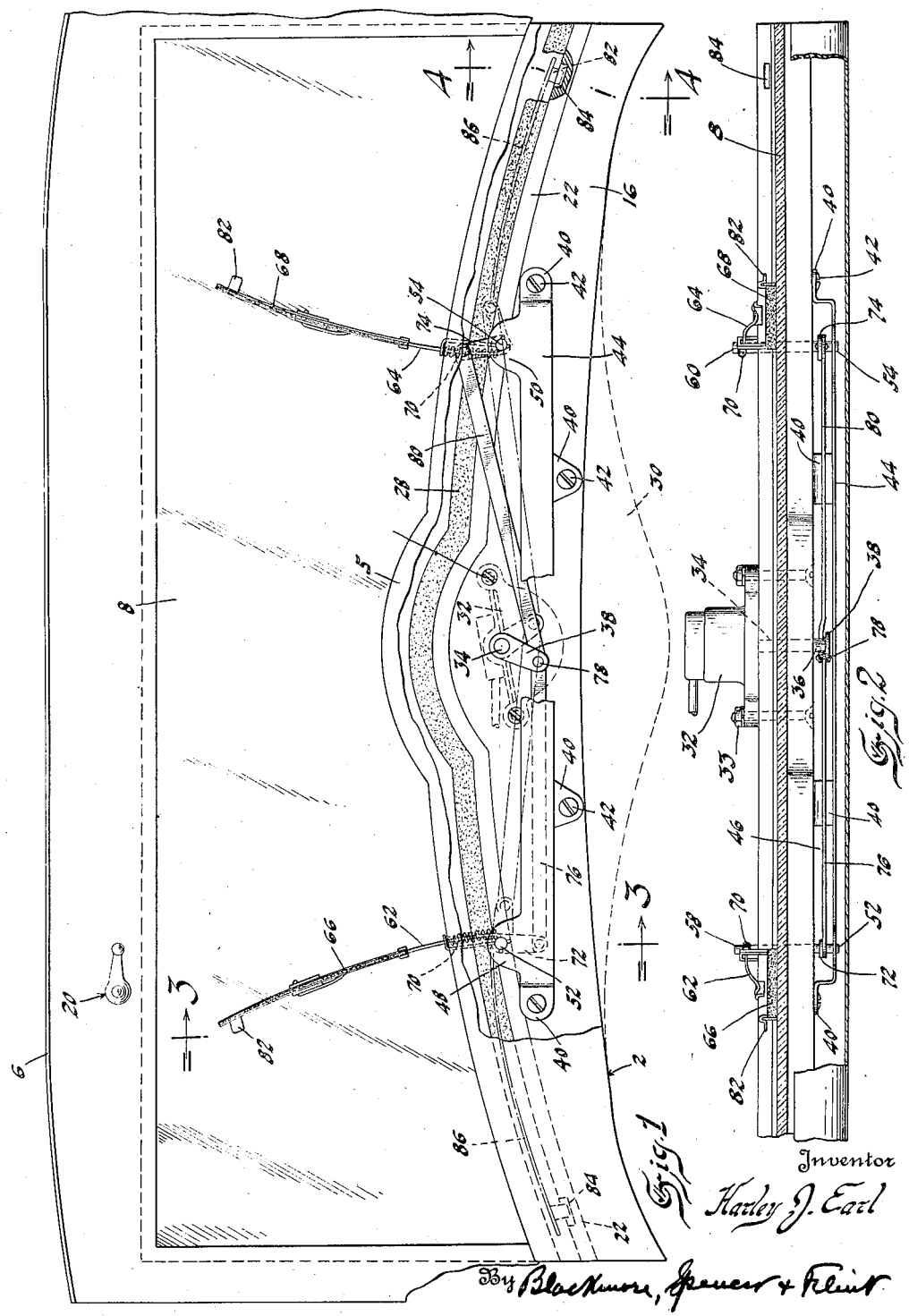

Patented Aug. 2, 1932

1,869,551

UNITED STATES PATENT OFFICE

HARLEY J. EARL, OF DETROIT, MICHIGAN, ASSIGNOR TO GENERAL MOTORS CORPORATION, OF DETROIT, MICHIGAN, A CORPORATION OF DELAWARE

WINDSHIELD WIPER

Application filed September 15, 1928. Serial No. 306,150.

This invention relates to windshield cleaners and is especially adapted to vehicle windshields of the movable type, particularly a windshield which moves up and down in a vertical plane, or what is known as the VV windshield.

In windshield wipers of prior constructions applied to the VV or slidable windshields, some difficulty has been encountered in their installation due to the fact that the windshield slid upwardly into the top member of the windshield frame and made it difficult to mount the mechanism for swinging the squeegee. The shaft of the squeegee is customarily mounted in and projects through the top cross member but due to the fact that the glass of the windshield slides into this upper frame member it has been found impracticable to project the shaft through the frame.

Where the automobile top is provided with a visor, the mechanism for moving the squeegee could be mounted at the front of the frame member and be hidden by the visor and in using such a construction no complications arose. Where no visor is used, the motor for moving the squeegee may be mounted on the outside of the upper frame member, but this seriously mars the appearance of the vehicle by exposing the unsightly motor and this construction has therefore been objectionable and its use avoided.

The present invention is concerned with a movable windshield applied to an automotive vehicle having no visor and in accordance with the invention the squeegee and the moving mechanism are mounted at the lower edge of the windshield so as to cause the squeegee to move in an arc having its center at substantially the bottom edge of the windshield.

In accordance with the present invention the shaft for operating the squeegee is projected through the cowl bar or lower frame member of the windshield and the squeegee attached to the front end of the shaft. The mechanism for moving the shaft and squeegee is mounted on the cowl bar beneath the cowl and to the rear of the instrument panel where it is out of the way and does not interfere with the vehicle's appearance.

The drawings disclose the invention as applied to a double squeegee, or one at each side of the vehicle, although it is adaptable to have one squeegee as well.

Each squeegee is provided with a lug or finger which engages in a recess at the windshield edge to hold the squeegee in lowered position and to prevent rattling.

Referring to the drawings,

Fig. 1 is a view of a windshield and the invention applied thereto, looking from the driver's seat, parts being broken away for purposes of clearer illustration.

Fig. 2 is a plan view of the structure of Fig. 1.

Fig. 3 is a transverse sectional view on the line 3—3 of Fig. 1.

Fig. 4 is a sectional view on the line 4—4 of Fig. 1.

Fig. 5 is a view similar to Fig. 1 of a modification.

Referring to the drawings, the numeral 2 indicates an automotive vehicle as a whole having the hood 4 and the cowl 5. The usual top is shown at 6 and the windshield at 8. The windshield is mounted in a suitable frame 10 having a top member 12, the side members 14 and the bottom frame member or cowl bar 16.

The side members 14 are suitably recessed to receive the lateral edges of the windshield 8 and the top member 12 is recessed as at 18 to allow the windshield to slide upwardly to allow a vent space at its lower portion between the windshield and lower frame portion.

The specific manner of mounting and the mechanism for sliding the windshield forms no part of the invention but is described and claimed in the patent to Simpson 1,604,103. The mechanism for raising and lowering the windshield is indicated as a whole at 20.

The cowl 5 rests on the edge of the cowl bar 16 and over the cowl bar there is placed the frame member 22 having a groove 24 for the reception of the dove-tail portion 26 of a rubber or fabric member 28. The lower edge of the windshield 8 rests on the fabric member 28 and when the windshield is raised there is provided a vent space or opening for the ingress of air which will pass between the instrument board 30 and the cowl bar 16 in the direction indicated by the arrows, Fig. 4.

Mounted on the front of the cowl bar 16 is an electric motor or a suction operated motor 32; secured by means of the screws or bolts 33. The motor is provided with a shaft 34 which extends through the cowl bar and projects beyond the rear side thereof as shown at 36, Fig. 2. Rigidly secured to the end 36 of the shaft 34 is a link or arm 38.

Rigidly secured to the rear of the cowl bar 16 by means of the ears 40 and the screws 42 is a frame member 44 which projects away or is spaced from the frame to form a pocket as shown at 46, Figs. 2 and 3. The frame 44 is provided with the upwardly extended ears 48 and 50 in which there are pivotally mounted the shafts 52 and 54. These shafts extend through the cowl bar 16 and project outwardly in front of the vehicle as shown at 58 and 60. Pivotally secured in the outer ends 58 and 60 of the shafts 52 and 54 are the arms 62 and 64 to which are attached the squeegees or cleaners 66 and 68 which are tightly held against the windshield by means of the springs 70 in a well known manner.

Rigidly secured to the inner ends of the shafts 52 and 54 are the arms 72 and 74 which preferably project in opposite directions as shown in Fig. 1. Pivotally secured to the end of the arm 72 is a link 76, the opposite end of which is pivotally secured as at 78 to the arm 38. Pivotally secured to the end of the arm 74 is a link 80, the opposite end of which is pivotally secured as at 78 to the end of the arm 38.

By referring to Fig. 1 it will be noted that the end of each squeegee is provided with a lug or finger 82 which is adapted to seat in a recess or opening 84 in the member 22 of the windshield frame. The purpose of this finger 82 and recess 84 is to firmly hold the squeegee and to keep it from rattling when it is in inoperative position.

From the above construction it will be apparent that the operating mechanism for the windshield cleaners or wipers is positioned beneath the vehicle cowl and to the rear of the instrument board and the only projecting or visible portion is a squeegee. It is to be further noted that when in inoperative position the squeegee lies parallel with the lower edge of the windshield and does not obstruct the vision of the driver as will be apparent from the dotted line position indicated by 86 in Fig. 1, and also the position of the squeegee as is seen in Fig. 4.

Referring to the species of Fig. 5, the distinction lies in the fact that the motor 32 is positioned on the inner or driver's side of the cowl bar and is also rigidly secured to the frame 44' by means of the screws or bolts 33.

The operation of the structure is as follows:

The motor or suction operated device 32 is placed in motion and gives an oscillatory movement to the arm 38 through the intermediary of the shaft 34, in a well known manner. The arm 38 will impart movement to the links 76 and 80 which in turn will swing the arms 72 and 74 to move the shafts 52 and 54, which in turn will give a to and fro or arcuate movement to the squeegees 66 and 68 to cause them to wipe over the surface of the windshield and rub away any accumulated rain or snow. By arranging the arms 72 and 74 in opposite directions with reference to the shafts 52 and 54, the squeegees will be caused to swing in opposite directions with respect to each other; that is, they will both either swing outwardly or inwardly. If desired, the mechanism may be so arranged that the squeegees will swing together or in the same direction at the same time. Each squeegee swings on an arc the center of which is substantially in line with the bottom of the windshield.

In mounting the squeegees and their operating mechanism at the bottom of the raisable windshield, and objectionable constructional difficulties are removed. The mechanism is also placed where it is out of the way and not subject to the injurious effects of the elements on the operating mechanism. A further advantage obtained is that the squeegees are substantially unnoticeable when in their inoperative position.

I claim:

1. For use on a windshield, a frame for said windshield, a wiper adapted to move over said windshield, and a lug on the wiper and a recess in the lower part of the frame to hold said wiper in stationary position substantially parallel with an edge of the windshield when in inoperative position.

2. For use on a windshield, a wiper adapted to move over said windshield, a frame for said windshield, said frame having a recess, in the lower portion thereof, and means on the wiper engaging in said recess to hold said wiper in stationary position substantially parallel with an edge of the windshield when in inoperative position.

In testimony whereof I affix my signature.

HARLEY J. EARL.